United States Patent
Strachan et al.

(10) Patent No.: US 10,419,346 B1
(45) Date of Patent: Sep. 17, 2019

(54) HASH COMPUTATION USING MEMRISTOR-IMPLEMENTED DOT PRODUCT ENGINE

(71) Applicant: Hewlett Packard Enterprise Development LP, Houston, TX (US)

(72) Inventors: John Paul Strachan, San Carlos, CA (US); Catherine Graves, Palo Alto, CA (US); Suhas Kumar, Palo Alto, CA (US)

(73) Assignee: HEWLETT PACKARD ENTERPRISE DEVELOPMENT L.P., Houston, TX (US)

( * ) Notice: Subject to any disclaimer, the term of this patent is extended or adjusted under 35 U.S.C. 154(b) by 0 days.

(21) Appl. No.: 15/966,719

(22) Filed: Apr. 30, 2018

(51) Int. Cl.
*H04L 9/06* (2006.01)
*G06F 17/16* (2006.01)
*H04L 29/06* (2006.01)
*H04L 12/743* (2013.01)
*G11C 11/16* (2006.01)

(52) U.S. Cl.
CPC ...... *H04L 45/7453* (2013.01); *G11C 11/1675* (2013.01); *H04L 9/0643* (2013.01); *H04L 63/0236* (2013.01); *G06F 17/16* (2013.01)

(58) Field of Classification Search
CPC ....... H04L 9/06; H04L 9/0643; G11C 13/004; G11C 2013/0042
See application file for complete search history.

(56) References Cited

U.S. PATENT DOCUMENTS

| | | | |
|---|---|---|---|
| 7,930,547 B2 | 4/2011 | Hao et al. | |
| 9,229,853 B2 | 1/2016 | Khan et al. | |
| 9,785,615 B1 * | 10/2017 | Merced Grafals | G06F 17/16 |
| 10,169,297 B2 * | 1/2019 | Buchanan | G06F 7/5443 |
| 2016/0321185 A1 | 11/2016 | Doshi et al. | |
| 2018/0039539 A1 | 2/2018 | Kim et al. | |
| 2018/0316493 A1 * | 11/2018 | Kvatinsky | H04L 9/0643 |

FOREIGN PATENT DOCUMENTS

| | | | | |
|---|---|---|---|---|
| WO | WO-2016064406 A1 * | 4/2016 | | G11C 7/1006 |
| WO | 2016068920 | 5/2016 | | |

OTHER PUBLICATIONS

Fan, J. et al.; "An Efficient Data Structure for Network Anomaly Detection"; Dec. 15, 2007; 13 pages.
Guo, Q. et al; "A Resistive TCAM Accelerator for Data-intensive Computing"; Dec. 3-7, 2011; 12 pages.
Azriel, L. et al.; "Towards a Memristive Hardware Secure Hash Function (MemHash)"; Feb. 27, 2017; 5 pages.

* cited by examiner

*Primary Examiner* — Matthew D Sandifer
(74) *Attorney, Agent, or Firm* — Michael A. Dryja

(57) ABSTRACT

An input string is mapped to a vector of input voltages. The vector is applied to input rows of a dot product engine having memristor elements at intersections of the input rows and output columns. A hash of the input string is determined based on output of the dot product engine as to which the vector of input voltages have been applied to the input rows thereof. An output column may be selected from output voltages of the columns, and the hash determined from the selected column. The output voltage of a column is equal to a sum of a product of the input voltage in each input row and a value of the memristor element at the intersection of the input row and the column. The hash can be used within a filtering technique applied to the input string, such as in the context of network security.

18 Claims, 8 Drawing Sheets

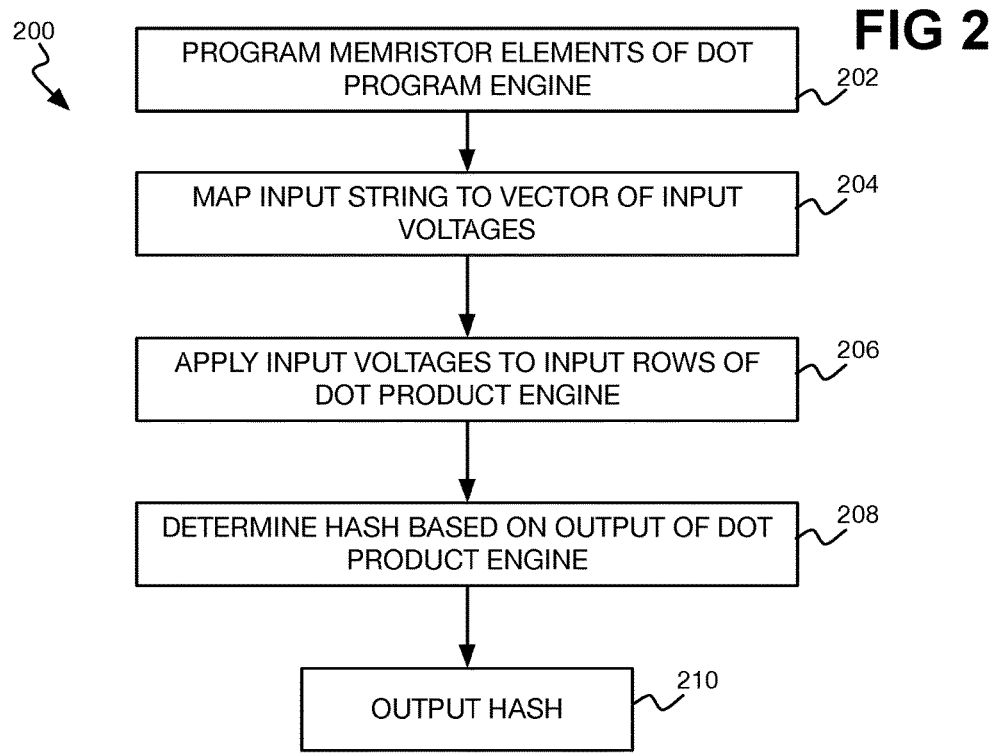
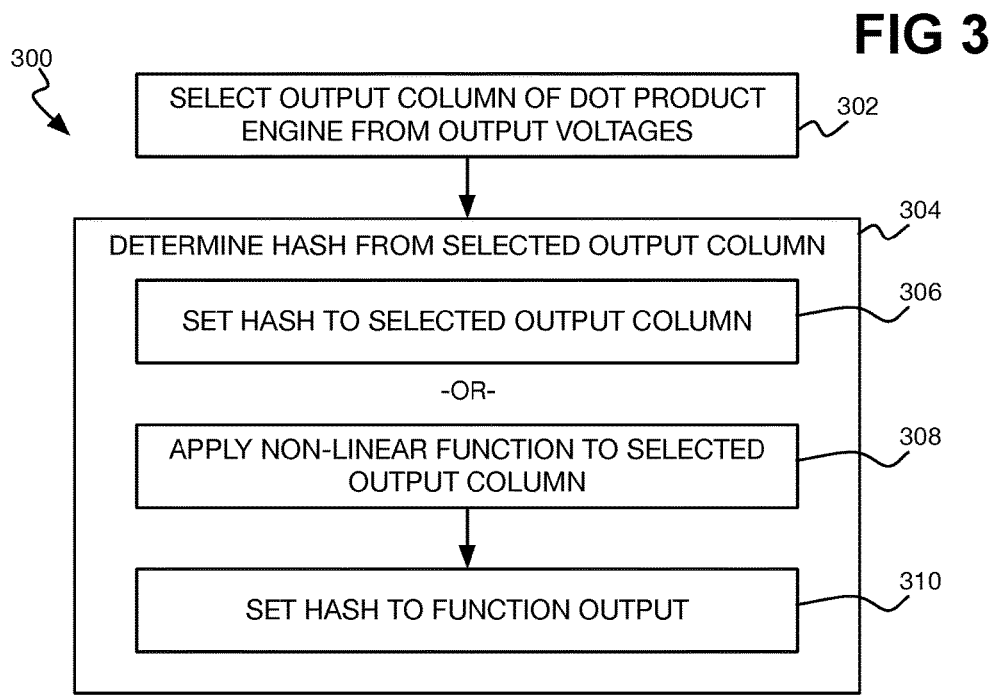

HASH COMPUTATION USING MEMRISTOR-IMPLEMENTED DOT PRODUCT ENGINE

BACKGROUND

With the advent of the Internet, computing devices with networking capability are potentially able to communicate with nearly any other computing device that is also connected to the Internet. Such ubiquitous communication capabilities have opened up usage scenarios and opportunities that were nearly unimaginable prior to the Internet. However, the Internet has proven to have drawbacks as well: nefarious users are now more easily able to penetrate local networks and access the computing devices connected to such networks, to both access the data stored on the computing devices and use the devices for their own malevolent purposes.

BRIEF DESCRIPTION OF THE DRAWINGS

FIG. 2 is a flowchart of an example method for determining a hash of an input string using a memristor-implemented dot program engine.

FIG. 3 is a flowchart of an example method for determining a hash of an input string based on the output of a memristor-implemented dot product engine, which can implement part of the method of FIG. 2.

DETAILED DESCRIPTION

Figure 1:
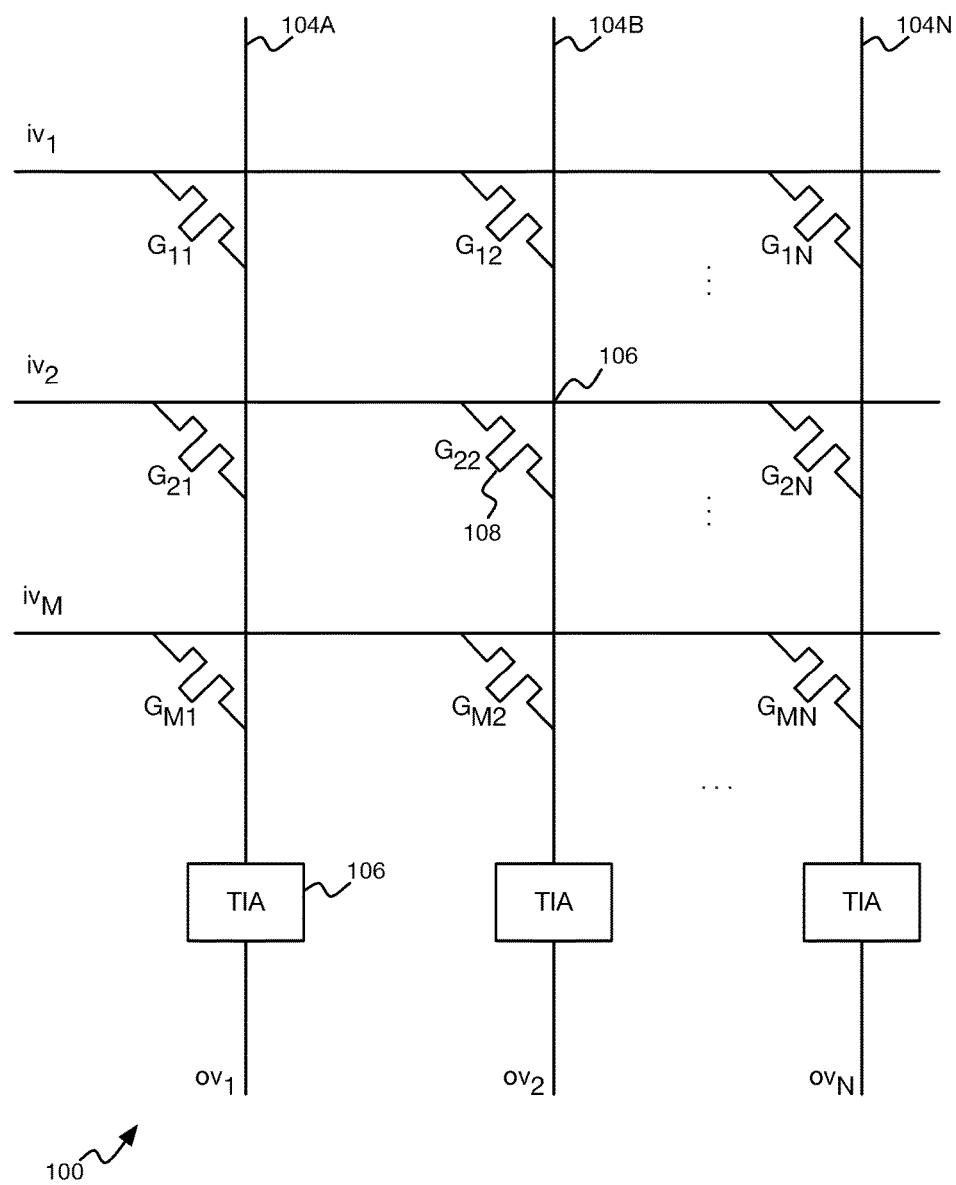
FIG. 1 is a diagram of an example memristor-implemented dot product engine that can be used to compute the hash of an input string.

As noted in the background section, along with the increasing interconnectedness of computing devices on a global scale has come the potential for computing devices to have their data and the control of the devices themselves compromised. In enterprise and other environments, computing devices like desktop and laptop computers, among other types of computing devices, are commonly connected to a local area network, which itself is connected to outside networks like the Internet via one or more managed points of access. These managed points of access can be responsible for ensuring the safety of data passing through them, before the data arrives at their intended destination computing devices on the network.

One way to accomplish such network security is to filter incoming (and potentially outgoing) data for known security threats, including malware, viruses, network attacks, and other types of security threats. Strings of data are thus compared to security threat signatures. If a data string of a data packet does not match an existing threat signature, then the packet may be permitted to pass (i.e., enter the local network, or leave the local network). If the data string does match an existing threat signature, its data packet can be tagged as an actual or potential security threat and its passage at least temporarily prevented. If tagged as a potential security threat, the data packet may undergo further scrutiny to determine if the packet indeed poses a threat.

Examples of network security filtering techniques include Bloom filtering and k-SAT filtering. In Bloom filtering, known security threat signatures are passed through multiple hash functions to realize a filter register. The filter register has a number of bits corresponding to the range of possible hashes that the hash functions can output. For each hash function applied to each security threat signature, the bit of the filter register corresponding to the resulting hash is set. To determine if a data string of a data packet is a potential security threat, the hash functions are also applied to the data string. If the resulting hashes are all set to in the filter register, than the data packet is a potential security threat.

In k-SAT filtering, known security threat signatures are similarly passed through multiple hash functions, but to realize what are referred to as clauses, which are defined as disjunctions of literals, which themselves are variables or the negations of variables. A k-SAT solver is employed to identify independent solutions, or formulas, that satisfy every clause. To determine if a data string of a data packet is a potential security threat, the hash functions are again also applied to the data string, with the resulting hashes corresponding to the data string's clause. If this clause satisfies all previously identified solutions, then the data packet is a potential security threat.

In Bloom filtering, k-SAT filtering, and other filtering techniques, therefore, multiple hash functions have to be applied to both known security threat signatures to generate the filters in a preprocessing stage, and then subsequently to data strings of data packets in a processing stage. Particularly as to the latter, how quickly hashes of data packet data strings are generated can affect if not dictate the throughput of such a filtering technique. For scenarios in which large amounts of data are received from and/or transmitted to an outside network, therefore, the ability to hash the data in real time or in near-real time can be important to maintain network communication performance.

Techniques described herein provide for efficient hash computation of multiple hash functions on input strings. The described hash computation techniques can thus be used in filtering applications, including network security filtering applications. The hash computation techniques described herein novelly leverage a dot product engine of memristors to quickly compute hashes. The described techniques, in other words, employ a dot product engine in a manner other than its originally intended manner: to compute hashes, instead of to compute vector dot products.

FIG. 1 shows an example memristor-implemented dot product engine 100 that can be used to determine the hash of an input string. The dot product engine 100 has M number of rows 102A, 1026, . . . , 102M, which are collectively referred to as the rows 102. The dot product engine 100 has N number of columns 104A, 104B, . . . , 104N, which are collectively referred to as the columns 104. At each intersection 106 of a row 102 and a column 104, the dot product engine 100 includes a memristor 108. The memristor 108 at each intersection 106 is more generally referred to as a memristor element, insofar as there may be more than one memristor at each intersection 106 to store a data value.

Analog input voltages $iv_1$, $iv_2$, . . . , $iv_M$ are applied to the rows 102, and constitute a vector IV of the input voltages. Output voltages $ov_1$, $ov_2$, . . . , $oV_N$ are provided at the outputs of transimpedance amplifiers (TIAs) 106 on the columns 104, and constitute a vector OV of the output voltages. The memristor 108 at the intersection of row x and column y has a programmed value, such as an analog voltage corresponding to a digital value of one or zero, equal to $G_{xy}$. The output voltage $ov_y$ for the y-ith column 104 is equal to the sum of the products $iv_x \cdot G_{xy}$ over the rows X=1 . . . M. That is, $$ov_y = \sum_{x=1}^{M} iv_x \cdot G_{xy}$$

The memristors 108 within the column y makes up a vector $\{G_{xy}\}$, x=1 . . . M. The output voltage $ov_y$ is therefore the dot product of the vector IV of the input voltages $iv_1$, $iv_2$, . . . , $iv_M$ and this vector $\{G_{xy}\}$. The memristors within all the rows x and all the rows y make up a matrix $\{G_{xy}\}$, for x=1 . . . M and y=1 . . . N.

A hash function is captured within the matrix $\{G_{xy}\}$. That is, the value $G_{xy}$ of the memristor 108 at every intersection 106, as specified by a row x and a column y, is programmed in correspondence with the hash function. For the purposes of network security filtering using a Bloom filtering technique, a k-SAT filtering technique, or another filtering technique, each value $G_{xy}$ may be a randomly selected value.

The hash function outputs an (integer) hash value, or hash, within a range corresponding to the number N of columns 104. If the hash function outputs just positive (integer) values, then the hash function can output integers from 1 . . . N. If the hash function outputs just non-negative (integer) values, then the hash function can output values integers from 0 . . . N−1. If the hash function outputs both non-negative and non-positive (integer) values, then the hash function can output integers from −m . . . +m, where N=2m+1.

The analog input voltages are set in correspondence with an input string for which a hash is to be computed. The input string has L characters $\{ch_1, ch_2, . . . , ch_L\}$, where L≤M (i.e., the number of characters in the input string is no greater than the number M of rows 102). Each character $Ch_x$ is mapped to a corresponding input voltage $iv_x$, and the x-th row 102 set to this input voltage. For example if each character $ch_x$ has B bits, then the input voltage $iv_x$ may be set to $$iv_x = \sum_{i=1}^{B} ch_i 2^{i-1}.$$

If L<M, then the input voltages $iv_y$, x>L can be set to zero.

The hash of the input string is then determined from the output voltages $ov_y$ of the rows y=1 . . . N. For instance, a y-ith column 104 can be selected from the output voltages on the columns 104, and the hash of the input string determined from this y-ith column 104 (i.e., based on the value y). As one example, the hash may be set to the selected output column. That is, if the hash function has potential output values 1 . . . N, then the hash is set to y. If the hash function has potential output values 0 . . . N−1, then the hash is set to y−1. If the hash function has potential output values −m . . . +m, then the hash is set to y−1/2. As another example, the hash may be set to the selected output column, after applying a non-linear function thereto. That is, for a non-linear function f, the hash is set to f(y), f(y−1), $$f\left(\frac{y-1}{2}\right),$$

f(y)−1, of f(y)−1/2.

The y-ith column 104 can be selected based on the output voltages on the columns 104 in a number of different ways. For example, the output column y can be selected as that which has a maximum output voltage $ov_y$. As another example, the output column y can be selected as that which has a minimum output voltage $ov_y$. As a third example, the output column y can be selected as that which has an output voltage $ov_y$ closest to zero (i.e., min($|ov_y|$)).

Rather than selecting a y-ith column 104 from the output voltages on the columns 104, the output voltages can be passed through a non-linear function, and then input to another memristor-implemented dot product engine having differently programmed memristors. One example of a non-linear function is simple quantization (rounding) of each column output voltage. A column of this second memristor-implemented dot product engine can then be selected, on which basis to determine the hash of the input string, in a manner as has been described above relative to the dot product engine 100. However, if application of a third memristor-implemented dot product engine is desired, the output voltages of the second dot product engine can be passed through (the same or different) non-linear function and then input to such a third dot product engine before selecting a column of the third engine from which to determine the hash. In general, more than one memristor-implemented dot product engine can be used, where between successively applied engines the output voltages are subjected to a non-linear function, and where a column of the last dot product engine is selected from which to determine the hash of the input string.

FIG. 2 shows an example method 200 for determining a hash of an input string using a memristor-implemented dot program engine. The method 200 may be implemented as program code executable by a processor of a computing device that also includes the dot program engine. The program code can be stored on a non-transitory computer-readable data storage medium.

The memristor elements of the dot program engine are a priori programmed with values corresponding to the hash function to be applied to the input string (202). As noted above, in one implementation, the memristor elements can have their values randomly selected to realize a hash function. The input string is further mapped to a vector of input voltages (204). Each character of the string can be mapped to an input voltage based on the digital value of the character, as has been described.

The input voltages are applied to the input rows of the dot product engine (206). The hash is then determined based on the output of the dot product engine (208). That is, the hash is determined based on the output voltages that the dot product engine outputs on its output columns. The method 200 ends with outputting of the hash (210).

FIG. 3 shows an example method 300 for determining the hash of an input string based on the output of a memristor-implemented dot product engine. The method 300 can thus implement part 208 of the method 200, in which case the dot product engine referred to in FIG. 3 is the same dot product engine referenced in FIG. 2. Like the method 200, the method 300 can be implemented as program code stored on a non-transitory computer-readable data storage medium and executable by a processor of a computing device that includes the dot product engine.

An output column of the dot product engine is selected based on the output voltages on the output columns of the engine upon applying the input voltages corresponding to the input string to the input rows of the engine (302). As has been described, the output column can be selected as the column that has the maximum output voltage, the column that has the minimum output voltage, or the column that has the output voltage closest to zero. The selected output column corresponds to an integer mapped to the column number of this column. For instance, if the y-th output column of N total output columns is selected, then the selected output column is y.

A hash is then determined from the selected output column (304). In one implementation, the hash is set to the selected output column (306). The setting in part 306 depends on the range of the hash function. If the hash function has a range from one through N, where N is the number of output columns, then the hash is equal to y. If the hash function has a range from zero to N−1, then the hash is equal to y−1. If the hash function has a range from $$-\frac{N-1}{2} \text{ to } +\frac{N-1}{2},$$

then the hash is equal to $$-\frac{N-1}{2} + y - 1.$$

In another implementation, the selected output column is first subjected to a non-linear function f (308), and then the hash is set to the output of this non-linear function (310). If the hash function has a range from one through N, then the hash is equal to f (y). If the hash function has a range from zero to N−1 or from $$-\frac{N-1}{2} \text{ to } +\frac{N-1}{2},$$

and if the output of the non-linear function is mapped to the hash function range, then the hash is respectively equal to f(y)−1 or f(y)−1/2. If the hash function has a range from zero to N−1 or from $$-\frac{N-1}{2} \text{ to } +\frac{N-1}{2},$$

and if the selected output column is mapped to the hash function range, then the hash is respectively equal to f(y−1) or $$f\left(\frac{y-1}{2}\right).$$

Figure 4:
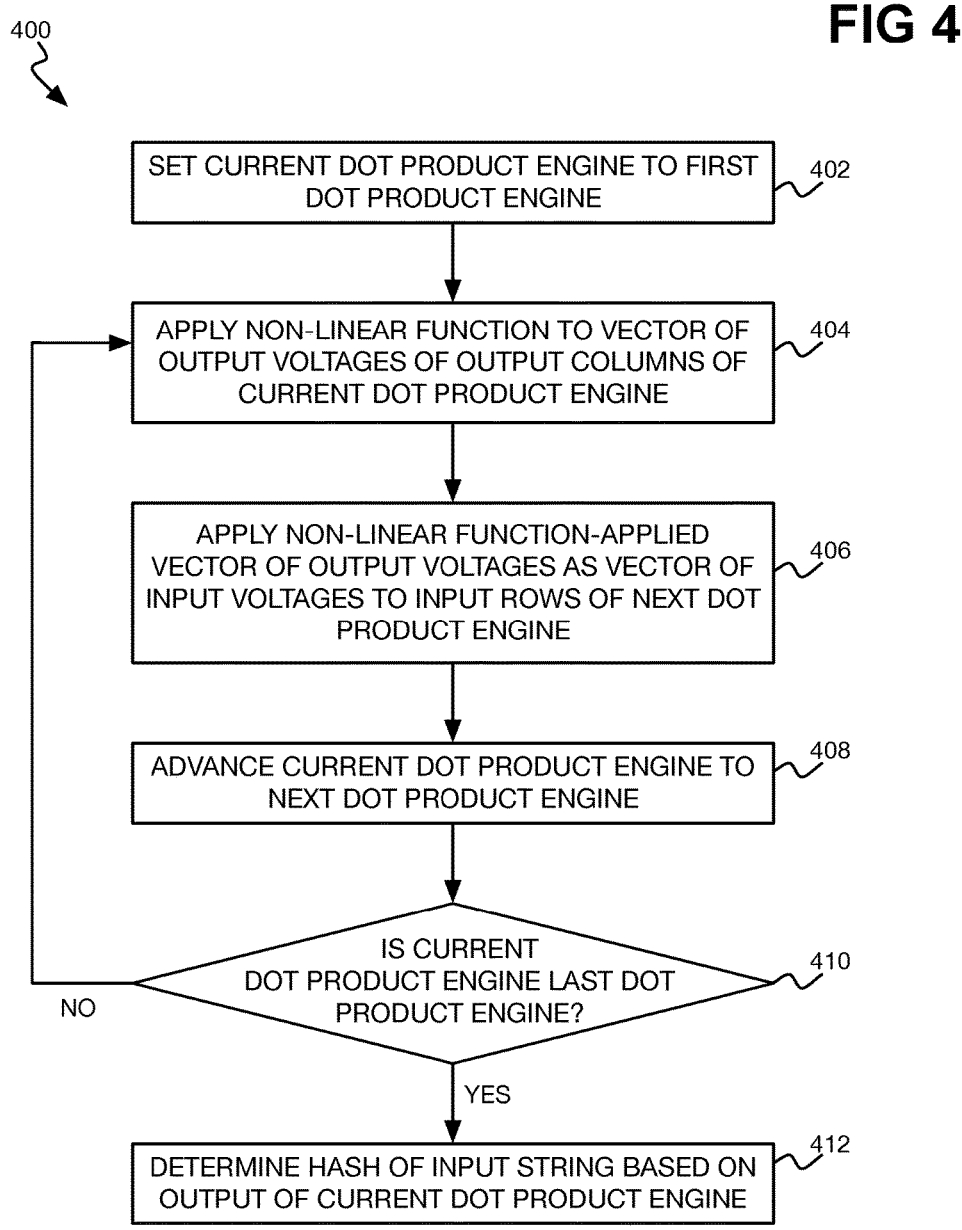
FIG. 4 is a flowchart of an example method for determining a hash of an input string using more than one memristor-implemented dot program engines, which can build upon the method of FIG. 2, and which can use the method of FIG. 3.

FIG. 4 shows an example method 400 for determining the hash of an input string using more than one memristor-implemented dot product engine, in an iterative or cascading manner. The method 400 assumes performance of the method 200, and is performed to implement part 208 of the method 200. That is, of the multiple dot product engines that are used in the method 400 to determine the hash of an input string, one is the dot product engine of the method 200. Like the methods 200 and 300, the method 400 can be implemented as program code stored on a non-transitory computer-readable data storage medium and executable by a processor of a computing device that includes the multiple dot product engines.

What is referred to as a current dot product engine is set to the first dot product engine (402). This is the dot product engine of the method 200. A non-linear function is applied to the vector of output voltages on the output columns of the current dot product engine (404). Unlike the non-linear function that has been described in relation part 308, which inputs an integer and outputs an integer, the non-linear function of part 404 inputs a real number (an output voltage) and outputs a real number.

The output of the non-linear function is thus itself a vector of real numbers, and is applied as a vector of input voltages to the input rows of the next dot product engine (406). The dot product engines may each have the same number of rows, and may each have the same number of columns. If the number of columns of the current dot product engine is greater than the number of rows of the next dot product engine, then just the non-linear-function-subjected output voltages of the first M columns of the current dot product engine are used as the input voltages of the M rows of the next dot product engine. That is, the output voltage of the first column of the current dot product engine is applied as the input voltage of the first row of the next dot product engine, after application of the non-linear function; the output voltage of the second column of the current engine is applied as the input voltage of the second row of the next engine, after application of the function; and so on.

If the number of columns of the current dot product engine is less than the number of rows of the next dot product engine, then in one implementation, then one or more non-linear-function-subjected output values of the current dot product engine may each be used as the input voltages of more than two rows of the next dot product engine. For example, the current dot product engine may have N columns, and the next product engine may have M rows, where N<M. Therefore, the output voltage of the first column of the current dot product engine may be applied as the input voltages of the first row and of the row N+1 of the next dot product engine, after application of the non-linear function. If M−N>1, then the output voltage of the second column of the current engine is applied as the input voltages of the second row and of the row N+2 of the next dot product engine, and so on.

The current dot product engine is advanced to the next dot product engine (408). That is, what is referred to as the current dot product engine is set to the (next) dot product engine to which the non-linear function applied vector of output voltages was applied in part 406. If this now current dot product engine is not the last dot product engine of the multiple dot product engines to be applied in the method 400

(410), then the method 400 is repeated at part 404. Each time part 404 is repeated, the same or different non-linear function may be applied.

Once the current dot product engine is the last dot product engine (410), then the hash of the input string is determined based on the output of this current dot product engine (412). Part 412 can be implemented by the method 300. That is, the current dot product engine becomes the dot product engine referred to in FIG. 3. As such, an output column of the current dot product is selected, and the hash of the input string is determined from this selected output column, per part 306 or parts 308 and 310 as has been described. The method 400 therefore applies more than one memristor-implemented dot product engine in an iterative or cascading manner, with intervening application of non-linear functions, to realize the hash of the input string.

Figure 5:
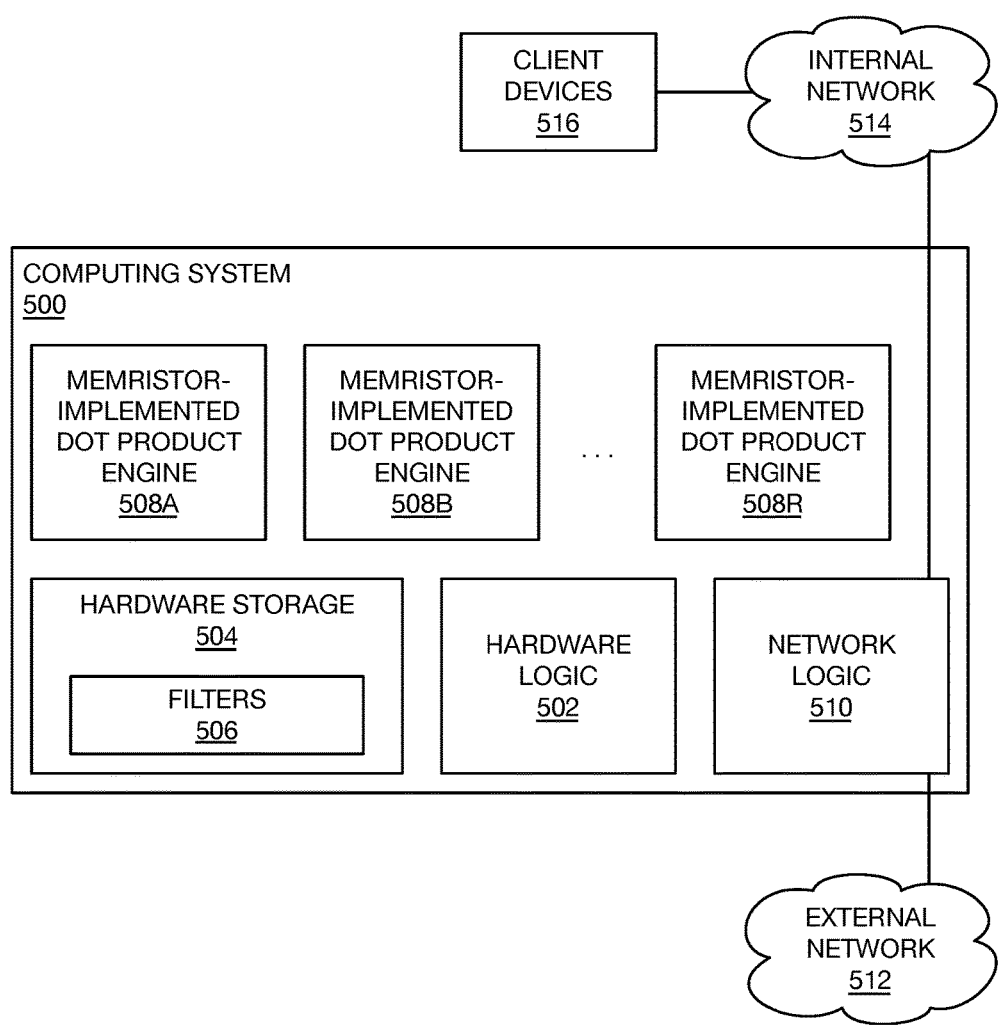
FIG. 5 is a diagram of an example system for filtering input strings using memristor-implemented dot product engines to hash the strings.

FIG. 5 shows an example system 500 for filtering data strings. The system 500 may be implemented as one or more computing devices, for instance, such as servers. The system 500 includes hardware logic 502. The hardware logic 502 can perform the methods that are described herein. The hardware logic 502 can be implemented as a processor and a non-transitory computer-readable data storage medium that stores code executable by the processor. The hardware logic 502 can instead be implemented as an application-specific integrated circuit (ASIC), or other specialized hardware. The system 500 includes hardware storage 504, which can be the non-transitory computer-readable data storage medium referenced above. The hardware storage 504 stores filters 506 that the hardware logic 502 uses to filter data strings.

The system 500 includes memristor-implemented dot product engines 508A, 508B, . . . , 508R, which are collectively referred to as the dot product engines 508. The dot product engines 508 each correspond to a hash function, as has been described; the memristors of a dot product engine 508, in other words, capture the hash function to which the dot product engine 508 corresponds. The dot product engines 508 may correspond to hash functions on a one-to-one basis, if just one dot product engine 508 is applied to an input string to generate a corresponding hash value for the string. The dot product engines 508 may also correspond to hash functions on a many-to-one basis, if more than one hash function is used to generate a corresponding hash value for the string, as has been described in relation to FIG. 4.

The hardware logic 502 filters an input string via a filtering technique using the filters 506. As part of this filtering, the hardware logic 502 applies the input string 502 to the dot product engines 508 to hash the input strings with the hash functions with which the filters 506 are associated. The hardware logic 502 may also a priori generate the filters 506, and as part of this generation, apply training strings to the dot product engines 508 to hash the training strings. In the case of network security, the training strings may be known security threat signatures, for instance. The dot product engines 508 used to generate the filters 506 are also used to hash input strings.

FIG. 5 shows the specific case in which the computing system 500 can be used for network security purposes. As such, the computing system 500 includes network hardware 510, such as one or more network adapters, which communicatively connects the system 500 to both an external network 512 and an internal network 514. The external network 512 may be or include the Internet, for instance, whereas the internal network 514 may be local network like an intranet and/or a local-area network (LAN). Client computing devices 516 can also be connected to the internal network 514, such that the client computing devices 516 communicatively reach the external network 512 through the computing system 500.

Therefore, when a data packet arrives at the computing system 500 from over the external network 512, the computing system 500 may divide the packet, or at least its payload, into input strings, and apply the filters 506 to each input string. Application of the filters 506 to an input string includes determining hash values of the string using the memristor-implemented dot product engines 508. Based on the filtering result of the input strings, the computing system 500 permits the data packet to pass through to the internal network 514 and to its destination client computing device 516 on the internal network 514, or prohibits the data packet from passing through. In the latter case, the system 500 thus identifies the data packet as containing an input string that potentially corresponds to a security threat. The data packet may be quarantined for further analysis to confirm whether or not the packet represents a network security threat. Filtering of outgoing data packets can be inspected in the same way as incoming data packets.

Figure 6:
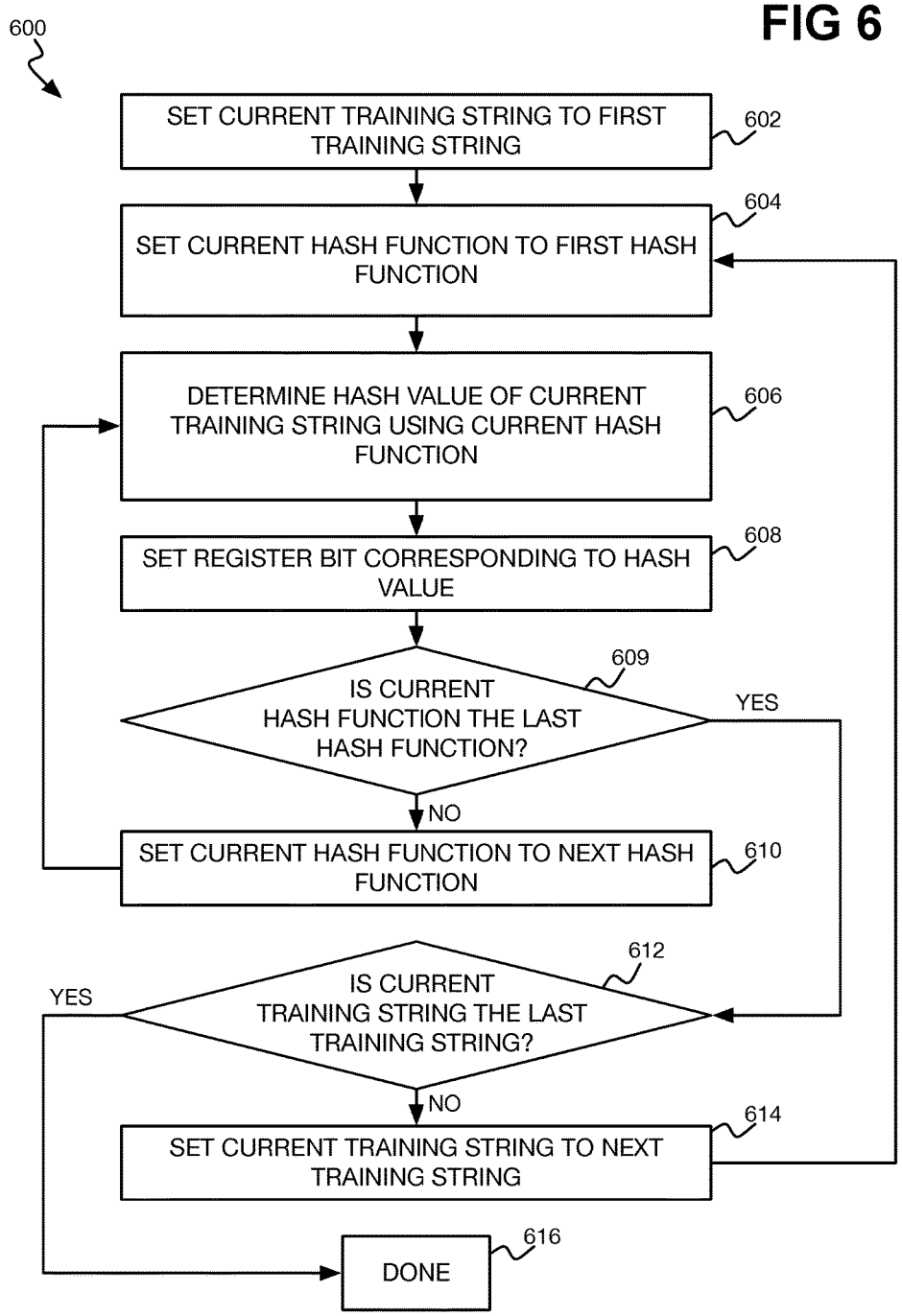
FIG. 6 is a flowchart of an example method for generating filters, using memristor-implemented dot product engines, for use in filtering input strings via a Bloom filtering technique.

FIG. 6 shows an example method 600 for generating the filters 506 from training strings, in the context of a Bloom filtering technique. The filters 506 in this case are represented as an S-bit register, where S is equal to the number of hash values that can be determined for each training string using the dot product engines 508. For instance, if each hash value can be within the range 1 . . . S, then there are S possible different hash values, and the register has S bits. The training strings may correspond to known security threat signatures, for instance, when the Bloom filtering technique is being used for network security purposes. Like the other methods that have been described, the method 600 can be implemented as program code stored on a non-transitory computer-readable data storage medium and executed by a processor.

What is referred to as the current training string is set to the first training string (602). Similarly, what is referred to as the current hash function is set to the first hash function (604). The hash value of the current training string is determined using the current hash function (606), via the dot product engines 508. The bit of the S-bit register corresponding to the hash value is set (608). For example, if the hash value is s, then the s-th bit of the register is set.

If the current hash function is not the last hash function (609), then the current hash function is advanced to the next hash function (610), and the method 600 repeated at part 606. If the current hash function is the last hash function (609), but the current training string is not the last training string (612), then the current training string is advanced to the next training string (614), and the method 600 repeated at part 604. Once the last training string has been processed (612), the method 600 is finished.

Therefore, in the method 600, each training string is hashed with each hash function. If there are T training strings and H hashes, then this means that T×H hash values are determined. For each such hash value, the corresponding bit of the register is set. The result of the method 600 is therefore the S-bit register with at most T x H bits thereof set, which represents the filters 506.

Figure 7:
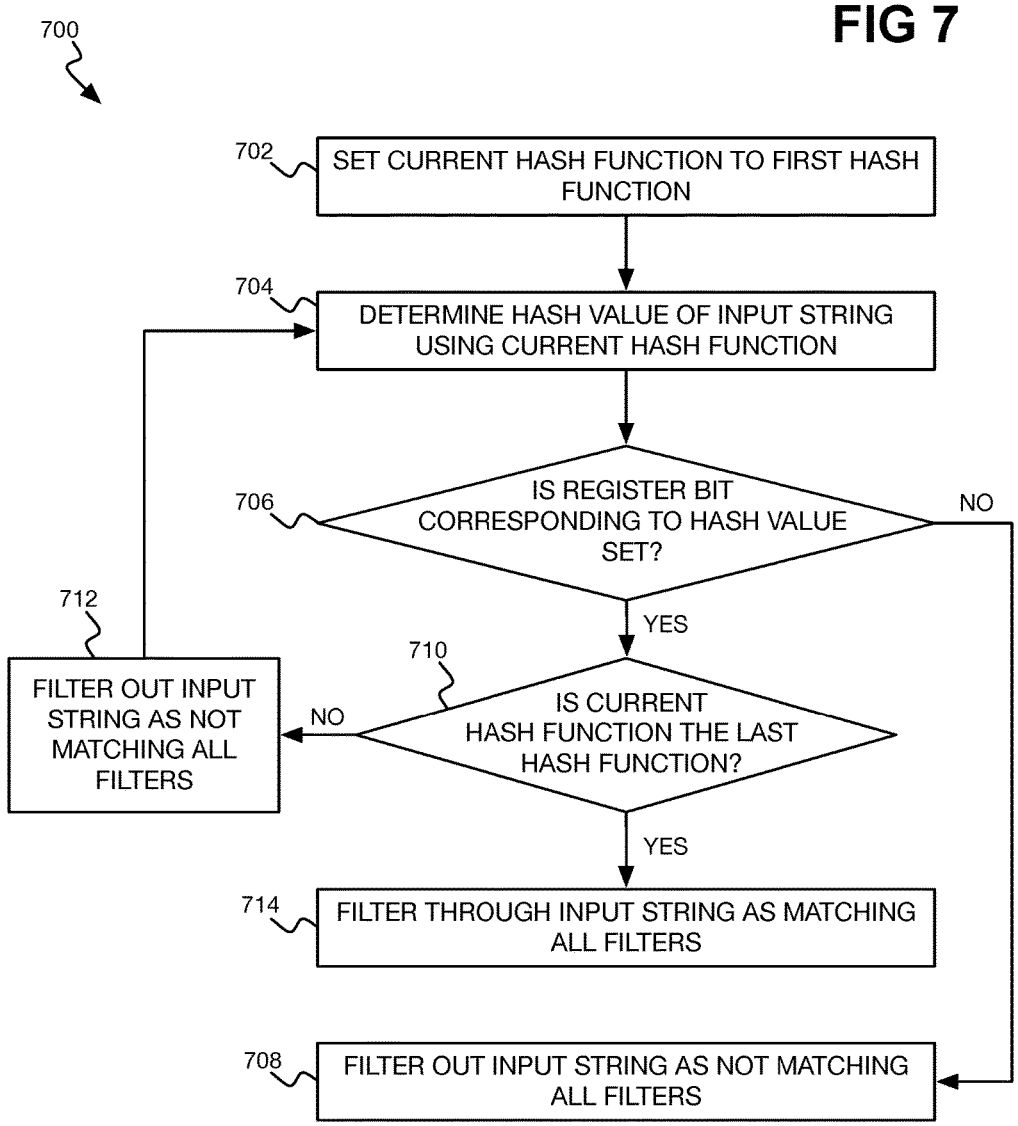
FIG. 7 is a flowchart of an example method for filtering input strings, using memristor-implemented dot product engines, via a Bloom filtering technique.

FIG. 7 shows an example method 700 for filtering an input string using the generated filters 506, in the context of a Bloom filtering technique. The filters 506 are thus represented as an S-bit register, as described. Like the other methods described herein, the method 700 can be implemented as program code stored on a non-transitory computer-readable data storage medium and executed by a processor.

What is referred to as a current hash function is set to the first hash function (702). The hash functions in relation to which the method 700 is performed can be the same hash functions that were used in the method 600 to generate the filters 506. The hash value of the input string is determined using the current hash function (704), via the dot product engines 508. If the bit within the S-bit register corresponding to the hash value was previously set in the method 600 (706), then the input string is filtered out as not matching all the filters 506 (708), and the method 700 can be finished. In the context of network security, the input string does not correspond to a potential security threat, and may be immediately permitted to pass.

However, if the bit within the register was not previously set in the method 600 (706), and the current hash function is not the last hash function (710), then the current hash function is advanced to the next hash function (712), and the method 700 is repeated at part 704. If the current hash function is the last hash function, though (710), then the input string is filtered through as matching all the filters 506 (714). That is, the bit within the register corresponding to the hash value of the input string is set for each hash function. In the context of network security, the input string potentially corresponds to a potential security threat, and is not immediately permitted to pass.

Figure 8:
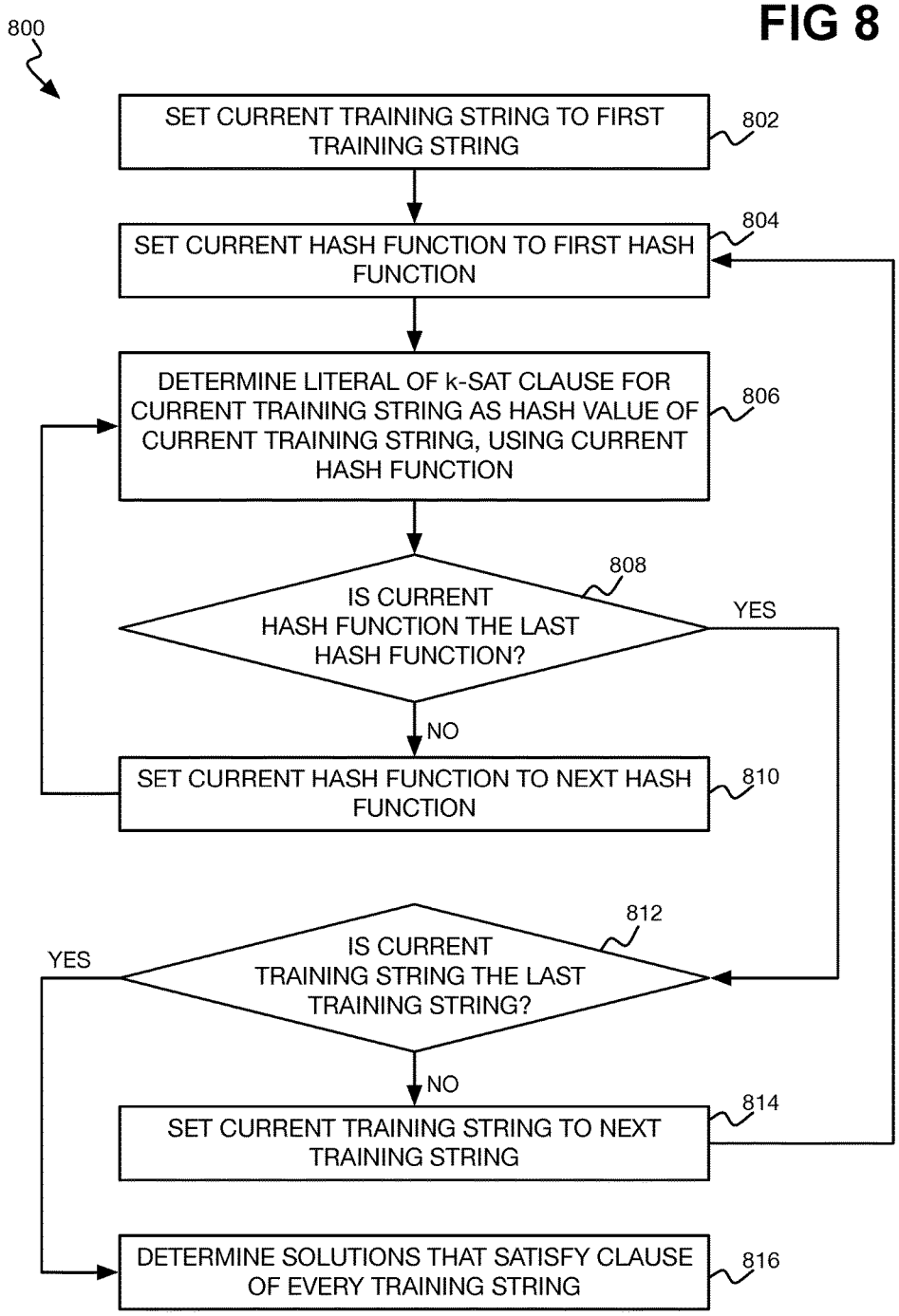
FIG. 8 is a flowchart of an example method for generating filters, using memristor-implemented dot product engines, for use in filtering input strings via a k-SAT filtering technique.

FIG. 8 shows an example method 800 for generating the filters 506 from training strings, in the context of a k-SAT filtering technique. The filters 506 in this case are represented as s number of independent solutions that satisfy k-SAT clauses generated for training strings, where the k-SAT clause of a training string is a disjunction of literals that can be determined using the dot product engines 508. Like the other methods that have been described, the method 800 can be implemented as program code stored on a non-transitory computer-readable data storage medium and executable by a processor.

What is referred to as the current training string is set to the first training string (802). Similarly, what is referred to as the current has function is set to the first hash function (804). A k-SAT literal of the k-SAT clause for the current training string is determined as the hash value of the current training string, using the current hash function (806), via the dot product engines 508. If the current hash function is not the last hash function (808), then the current hash function is advanced to the next hash function (810), and the method 800 repeated at part 806.

Once the last hash function has been reached for the current training string (808), this means that the k-SAT clause for the current training string has been generated. As noted above, the k-SAT clause is defined as a disjunction of literals. Each literal is generated in the method 800 as a hash value. Therefore, the number of literals for the current training string is equal to the number of hash functions.

If the current training string is not the last training string (812), then the current training string is advanced to the next hash function (814), and the method 800 repeated at part 804. Once the last training string has been reached (812), this means that a k-SAT clause has been generated for each training string. Independent k-SAT solutions that satisfy the k-SAT clause of every training string are thus determined (816), such as by using a k-SAT solver. The number of such solutions that are to be found can be specified arbitrarily, and these k-SAT solutions represent the filters 506.

Figure 9:
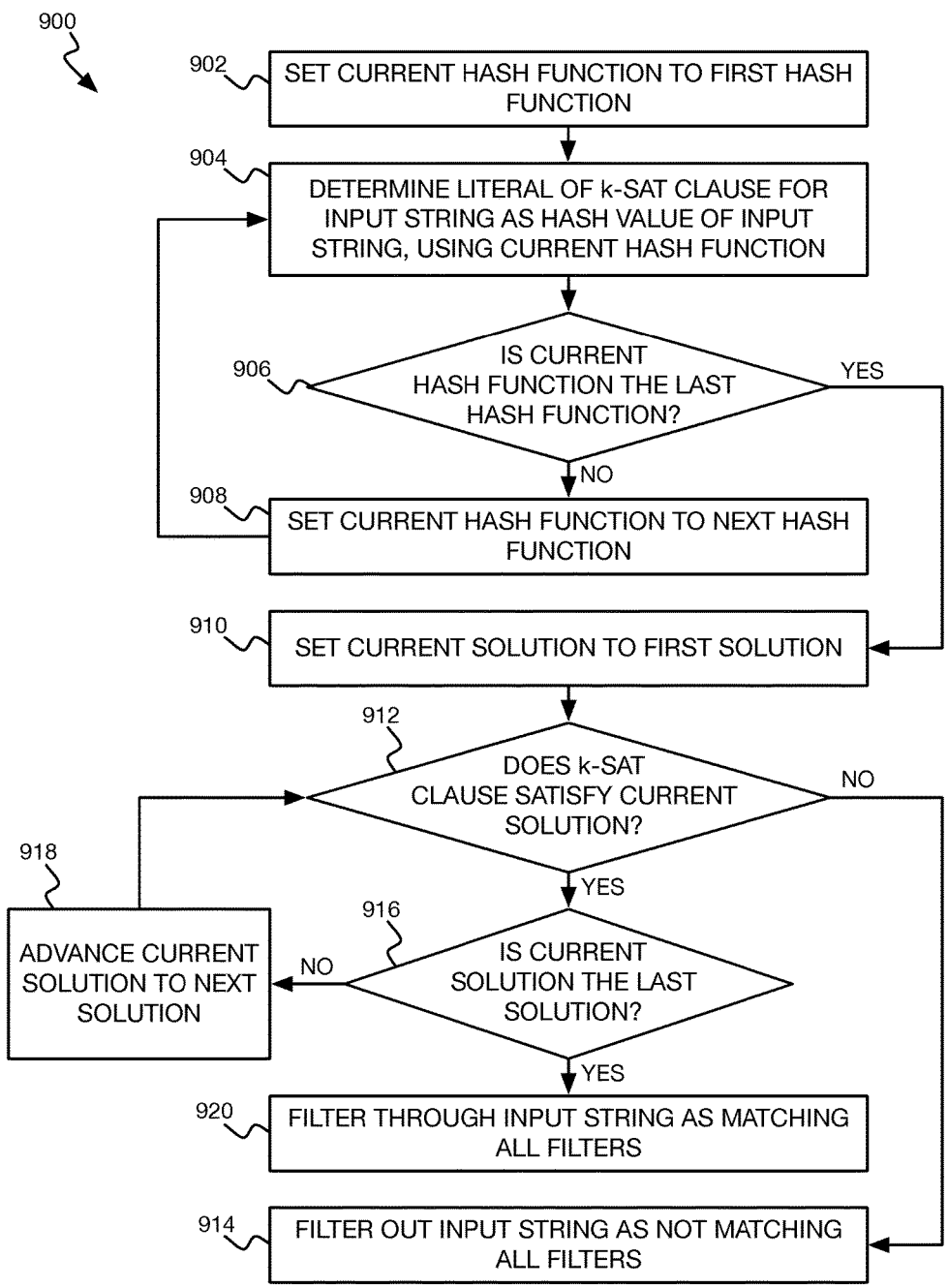
FIG. 9 is a flowchart of an example method for filtering input strings using memristor-implemented dot product engines, via a k-SAT filtering technique.

FIG. 9 shows an example method 900 for filtering an input string using the generated filters 506, in the context of a k-SAT filtering technique. The filters 506 are the k-SAT solutions that satisfy the k-SAT clauses of the training strings, as described. Like the other methods described herein, the method 900 can be implemented as program code stored on a non-transitory computer-readable data storage medium and executed by a processor.

What is referred to as a current hash function is set to the first hash function (902). The hash functions in relation to which the method 900 is performed can be the same hash functions that were used in the method 800 to generate the filters 506. A literal of the k-SAT clause for the input string is determined as the hash value of the input string, using the current hash function (904), via the dot product engines 508. If the current hash function is not the last hash function (906), then the current hash function is advanced to the next hash function (908), and the method 900 repeated at part 900.

Once the last hash function has been reached for the input string (906), this means that the k-SAT clause for the input string has been generated. As noted above, the k-SAT clause is defined as a disjunction of literals. Each literal is generated in the method 900 as a hash value. Therefore, the number of literals for the input string is equal to the number of hash functions.

What is referred to herein as a current solution is set to the first solution that was previously generated (910). If the k-SAT clause for the input string does not satisfy the current solution (912), then the input string is filtered out as not matching all the filters 506 (914), since the solutions constitute the filters 506; the method 900 can be finished. In the context of network security, the input string does not correspond to a potential security threat, and may be immediately permitted to pass.

However, if the k-SAT clause for the input string satisfies the current solution (912), and the current solution is not the last solution (916), then the current solution is advanced to the next solution (918), and the method 900 is repeated at part 912. If the current solution is the last solution, though (916), then the input string is filtered through as matching all the filters 506 (920). That is, the k-SAT clause for the input string satisfies every solution. In the context of network security, the input string potentially corresponds to a potential security threat, and is not immediately permitted to pass.

The techniques that have been described herein use memristor-implemented dot product engines to quickly compute hashes. As such, these techniques can be employed to filter input strings, as well as in other scenarios, in which large numbers of hashes have to be computed. Therefore, the techniques described herein can be used in the context of network security, to identify incoming input strings as potential security threats.

We claim:

1. A method for computing a hash of an input string, comprising:
    mapping, by a processor, the input string to a vector of input voltages;
    applying, by the processor, the vector of input voltages to a plurality of input rows of a memristor-implemented dot product engine having memristor elements at intersections of the input rows and a plurality of output columns;
    selecting, by the processor, an output column of the dot product engine from output voltages of the output columns, the output voltage of each output column equal to a sum of a product of the input voltage in each input row and a value of the memristor element at an intersection of the input row and the output column;

determining, by the processor, the hash of the input string from the selected output column; and outputting, by the processor, the hash of the input string.

2. The method of claim 1, wherein the memristor elements of the dot product engine are preprogrammed with randomly selected values prior to application of the input voltages to the input rows of the dot product engine.

3. The method of claim 1, wherein selecting the output column of the dot product engine comprises:

selecting the output column having a maximum output voltage.

4. The method of claim 1, wherein selecting the output column of the dot product engine comprises:

selecting the output column having a minimum output voltage.

5. The method of claim 1, wherein selecting the output column of the dot product engine comprises:

selecting the output column having an output voltage closest to zero.

6. The method of claim 1, wherein determining the hash of the input string from the output voltage of the selected output column comprises:

setting the hash of the input string to the selected output column.

7. The method of claim 1, wherein determining the hash of the input string from the output voltage of the selected output column comprises:

applying a non-linear function to the selected output column to provide a function output; and setting the hash of the input string to the function output.

8. A non-transitory computer-readable data storage medium storing instructions executable by a processor to compute a hash of an input string by:

mapping the input string to a vector of input voltages;

applying the vector of input voltages to a plurality of input rows of a first memristor-implemented dot product engine having memristor elements at intersections of the input rows and a plurality of output columns, the output voltage of each output column equal to a sum of a product of the input voltage in each input row and a value of the memristor element at an intersection of the input row and the output column;

applying a non-linear function to a vector of output voltages of the output columns of the first dot product engine;

applying the non-linear function-applied vector of output voltages to a plurality of input rows of a second memristor-implemented dot product engine having memristor elements at intersections of the input rows and a plurality of output columns thereof;

determining the hash of the input string based on output of the second engine as to which the non-linear function applied vector of output voltages have been applied to the input rows thereof; and outputting the hash of the input string.

9. The non-transitory computer-readable data storage medium of claim 8, wherein determining the hash of the input string based on the output of the second dot product engine comprises:

selecting, by the processor, an output column of the second dot product engine from output voltages of the output columns, the output voltage of each output column equal to a sum of a product of the input voltage in each input row and a value of the memristor element at an intersection of the input row and the output column;

determining the hash of the input string from the selected output column.

10. The non-transitory computer-readable data storage medium of claim 9, wherein determining the hash of the input string from the output voltage of the selected output column comprises:

setting the hash of the input string to the selected output column.

11. The non-transitory computer-readable data storage medium of claim 9, wherein determining the hash of the input string from the output voltage of the selected output column comprises:

applying a non-linear function to the selected output column to provide a function output; and setting the hash of the input string to the function output.

12. A system comprising:

hardware storage to store a plurality of filters particular to a filtering technique and associated with a plurality of hashes;

a plurality of memristor-implemented dot product engines corresponding to the hashes with which the filters are associated, each dot product engine having memristor elements at intersections of a plurality of input rows and a plurality of output columns; and hardware logic to filter an input string via the filtering technique using the filters and by, for each dot product engine, applying a vector of input voltages corresponding to the input string to the input rows of the dot product engine and selecting an output column of the dot product engine from output voltages of the output columns of the dot product engine, to hash the input string with the hashes with which the filters are associated, wherein, for each dot product engine, the output voltage of each output column is equal to a sum of a product of the input voltage in each input row and a value of the memristor element at an intersection of the input row and the output column.

13. The system of claim 12, wherein the hardware logic is further to generate the filters by applying a plurality of training strings to the dot product engines to hash the training strings.

14. The system of claim 12, wherein the filtering technique is a Bloom filtering technique.

15. The system of claim 14, wherein the hardware logic is to filter the input string by:

for each hash, using the input string as applied to the dot product engine corresponding to the hash in determining a hash value of the input string for the hash;

in response to the hash value of the input string for any hash not being set within the filter for the hash, filtering out the input string as not matched to the filters; and in response to the hash value of the input string for every hash being set within the filter for the hash, filtering through the input string as matched to the filters.

16. The system of claim 12, wherein the filtering technique is a k-SAT filtering technique.

17. The system of claim 16, wherein the hardware logic is to filter the input string by:

for each hash, using the input string as applied to the dot product engine corresponding to the hash in determining a hash value of the input string for the hash;

for each hash, setting a literal of a clause for the input string within the k-SAT filtering technique to the hash value of the input string for the hash;

in response to the clause for the input string failing to satisfy any filter, filtering out the input string as not matched to the filters; and in response to the clause for the input string satisfying every filter, filtering through the input string as matched to the filters.

18. The system of claim 12, wherein the input string is a received over a network, and the hardware logic is to filter the input string to determine whether the input string is a potential network security threat by:

in response to the filtering technique filtering out the input string, determining that the input string is a not a potential network security threat and immediately permitting the input string to pass; and in response to the filtering technique filtering through the input string, determining that the input string is a potential network security threat and not immediately permitting the input string to pass.

\* \* \* \* \*